(12) United States Patent
Bierer et al.

(10) Patent No.: US 8,751,377 B2
(45) Date of Patent: *Jun. 10, 2014

(54) EMERGENCY FINANCIAL RESERVE ACCESSIBLE DURING A COVERED EVENT

(75) Inventors: Jeffrey H. Bierer, Charlotte, NC (US); Andrew Kramer, Charlotte, NC (US); Robert M. Mauldin, Charlotte, NC (US); Thomas Myrick, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 171 days.

This patent is subject to a terminal disclaimer.

(21) Appl. No.: 12/790,321

(22) Filed: May 28, 2010

(65) Prior Publication Data

US 2010/0306108 A1 Dec. 2, 2010

Related U.S. Application Data

(63) Continuation-in-part of application No. 11/839,066, filed on Aug. 15, 2007.

(51) Int. Cl.
G06Q 40/00 (2012.01)

(52) U.S. Cl.
USPC .......................................................... 705/38

(58) Field of Classification Search
USPC .................................. 705/35–45, 4
See application file for complete search history.

(56) References Cited

U.S. PATENT DOCUMENTS

| | | | |
|---|---|---|---|
| 6,315,196 B1 * | 11/2001 | Bachman | 235/380 |
| 6,332,125 B1 * | 12/2001 | Callen et al. | 705/4 |
| 6,944,597 B2 * | 9/2005 | Callen et al. | 705/4 |
| 7,182,253 B1 * | 2/2007 | Long | 235/379 |
| 7,421,406 B2 * | 9/2008 | Dixon et al. | 705/36 R |
| 7,533,803 B2 * | 5/2009 | Long, Sr. | 235/379 |
| 7,941,355 B1 * | 5/2011 | DeLoach | 705/35 |
| 8,255,301 B1 * | 8/2012 | Willin et al. | 705/35 |
| 8,606,603 B2 * | 12/2013 | Annappindi | 705/4 |
| 2002/0091553 A1 * | 7/2002 | Callen et al. | 705/4 |
| 2002/0198801 A1 * | 12/2002 | Dixon et al. | 705/35 |
| 2003/0009358 A1 * | 1/2003 | Greenfeld et al. | 705/4 |
| 2003/0155416 A1 | 8/2003 | Macklin et al. | |

(Continued)

OTHER PUBLICATIONS

UC Davis Policy and Procedure Manual: Section 380-56 Employee Emergency Loan Fund, Nov. 18, 2005.*

(Continued)

*Primary Examiner* — Mohammad Z Shaikh
(74) *Attorney, Agent, or Firm* — Michael A. Springs; Moore & Van Allen PLLC; James C. Edwards

(57) ABSTRACT

A system and method for providing emergency reserve conditional credit to a customer of a financial institution. The emergency conditional credit may be provided to the customer in the form of a line-of-credit or a loan based on the occurrence of a predetermined condition, such as involuntary unemployment, disability or the like. The emergency reserve product of the present invention is a product that can be offered through a financial institution or other ER-providing entity and, as such, does not require the level of regulation required of an insurance product. The invention also provides for the emergency reserve product to be offered in conjunction with a debt cancellation feature, referred to as emergency reserve protection, which serves to cancel the outstanding debt associated with the loan or line-of-credit.

13 Claims, 11 Drawing Sheets

(56) References Cited

U.S. PATENT DOCUMENTS

| | | | |
|---|---|---|---|
| 2005/0038681 A1* | 2/2005 | Covert | 705/4 |
| 2005/0060206 A1* | 3/2005 | Mitchell | 705/4 |
| 2005/0125259 A1* | 6/2005 | Annappindi | 705/4 |
| 2005/0216315 A1 | 9/2005 | Andersson | |
| 2005/0228749 A1 | 10/2005 | Lozano | |
| 2005/0289044 A1* | 12/2005 | Breslin et al. | 705/38 |
| 2006/0106640 A1* | 5/2006 | Deline | 705/2 |
| 2006/0155590 A1* | 7/2006 | Graham | 705/4 |
| 2008/0005001 A1* | 1/2008 | Davis et al. | 705/35 |
| 2008/0183636 A1* | 7/2008 | Walsh et al. | 705/36 R |
| 2009/0048972 A1* | 2/2009 | Bierer et al. | 705/44 |
| 2010/0306108 A1* | 12/2010 | Bierer et al. | 705/44 |
| 2011/0087594 A1* | 4/2011 | Bierer et al. | 705/44 |

OTHER PUBLICATIONS

UC Davis: Employee Emergency Loan Fund: Accounting Manual ( Dec. 31, 2003; pp. 1-8).*

Diekmann, Frank J, "Pink Slip? Product Offers Some Relief", Credit Union Journal, 6.40, Oct. 7, 2002, p. 10.*

Panko, Ron, "Resuscitating Credit Life", Best's Review, 103.9, (Jan. 2003), pp. 62-66.*

Reilley, Bob, "Debt Cancellation: the preferred alternative to credit insurance", ABA Banking Journal's White Paper, Oct. 2001, pp. 1-6.*

Mayer, Caroline E, Lenders Peddle Protection, at A Hefty Profit; Debt Coverage Unregulated and Pricey for Consumers: [Final Edition], The Washington Post [Washington, D.C], Mar. 13, 2004, pp. 1-3.*

"Rep. Melancon, Congressional Leadership Discuss Progress of Katrina/Rita Hurricane Recovery Legislation", US Fed News Service, Including US State News [Washington, D.C], Mar. 29, 2007, pp. 1-6.*

UC Davis Policy and Procedure Manual: Section 380-56 Employee Emergency Loan Fund, Sep. 22, 2006, pp. 1-2.*

UC Davis: Employee Emergency Loan Fund: Accounting Manual, Dec. 31, 2003; pp. 1-8.*

Krebsbach, Karen, "The Rush Towards DCCs and DSAs; Credit Insurance is the common insurance offered by banks, but the fact will soon be history. More Banks are beginning to offer the potentially more lucrative DCCs and DSAs, regulated as "banking products"", Bank Investment Consultant, 11.4, (Apr. 2003). pp. 38-39.*

Hale, S, "Orlando, Fla, Businesses Still Hurting from Terrorist Attacks", Knight Ridder Tribune News, Nov. 8, 2002, pp. 1-1.*

Anonymous, "Do you need credit-protection insurance?", Consumers' Resarch Magazine 86.10, (Oct. 2003), pp. 28-30.*

International Search Report and the Written Opinion of the International Searching Authority mailed Jun. 8, 2009 for International Application No. PCT/US 08/73277.

International Preliminary Report on Patentability mailed Feb. 25, 2010 for International Application No. PCT/US2008/073277.

* cited by examiner

EMERGENCY FINANCIAL RESERVE ACCESSIBLE DURING A COVERED EVENT

REFERENCE TO CO-PENDING APPLICATION FOR PATENT

The present invention is a continuation-in-part of U.S. patent application Ser. No. 11/839,066, entitled, "System and Method for an Emergency Reserve During a Covered Event Using Actuarial Data," filed on Aug. 15, 2007, assigned to the assignee of the present application, the contents of which are hereby incorporated by reference in their entirety.

FIELD

In general, embodiments herein disclosed relate to systems, methods, and computer program products for providing an emergency financing reserve and, more specifically, providing an emergency reserve, in the form of either a line of credit or a loan, that is accessible based on occurrence of a predetermined covered event/condition

BACKGROUND

Emergency situations related to loss of income put many people in situations that they are not ready for. A very large percentage of the American population lacks the appropriate resources to deal with an interruption in income. Many within this population do have access to credit, but in many cases that credit is maxed out. A significant portion of that overall subset falls into the low-FICO (Fair Isaac Corporation) credit score/thin credit file/no hit file category which has even fewer reputable, easy to access, non-usurious options for obtaining credit. Many financial institutions' own credit underwriting standards exclude a very large portion of its own population. These financial institutions are only able to extend a pre-approved credit offer to a small percentage of new checking account applicants.

The inability of many people to handle loss of income has been widely published. For example: "[a] one week delay (in pay) would cause 40% of American workers to cut back on critical payments, including rent, mortgage, credit card and utility bills" (Source: ADP Payroll Services Survey); "[n]early one-quarter (22 percent) of U.S. respondents said that once they have covered their basic living expenses, they have no money left over" (Source: ACNielsen Online Consumer Confidence Survey, September 2006); and also almost one-half of all U.S. adults (45%) say their household does not have enough money in liquid savings to cover at least 3 months of living expenses (Source: Harris Interactive nationwide survey of 2,328 adults, February 2006). Most recently a GFK Roper survey of Americans' emergency savings commissioned by Brankrate reported that 54% do not have an emergency savings fund established (Source: Brankrate.com, Jul. 23, 2007).

Customers who do not currently have enough in savings to cover themselves and their families during a period of income interruption are, for the most part, faced with the following options:

TABLE 1

| Option | Average APR | Availability |
| --- | --- | --- |
| Family | NA | Dependent on a number of factors, but in most cases family is not a viable option |
| Unsecured Loans | ≥30% | Limited to those who have a good credit history and proven means of repayment |
| Pay Day Lending | 300%-500% | Current employment required |
| Title Loans | 200%-400% | Must be sole owner of the vehicle |
| Pawn Shops | 100%-200% | availability limited only by the amount of pawnable goods the customer owns |
| Credit Cards | ≥34% | Limited to those who have good credit and available credit |

Source: Center for Responsible Lending

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to a method for providing emergency conditional credit in the form of a line of credit or a loan. The method for providing an emergency financial reserve defines embodiments of the invention. The method includes receiving, at a computing device, terms of an emergency financial reserve agreement associated with a customer. The terms provide for the customer to receive emergency reserve funds or receive access to the emergency reserve funds based upon occurrence of one of one or more predetermined covered events and provide for an emergency reserve-providing entity to receive a fee from the customer in exchange for the emergency financial reserve. The one or more predetermined covered events may include one or more of involuntary unemployment, disability, hospitalization, lifecycle events, moving, childbirth, retirement or the like. The method further includes storing, at computing device memory, the terms of the emergency financial reserve agreement. Additionally, the method includes receiving a covered event indication from the customer that indicates an occurrence of one of the one or more covered events and verifying the occurrence of the covered event and validity of the emergency financial reserve. Lastly, the method includes providing, via a computing device, the customer with a predetermined amount of funds from the emergency financial reserve or access to a predetermined amount of funds from the emergency financial reserve for a predetermined interval based on the verification of the occurrence of the covered event and verification of the validity of the emergency financial reserve.

In specific embodiments of the method the terms of the emergency financial reserve agreement provide for the emergency financial reserve to be configured as a line-of credit. In such embodiments, providing the customer with access to a predetermined amount further includes providing the customer with access to a predetermined portion of the line-of-credit for the predetermined interval. Moreover, in such embodiments, providing further includes providing the customer electronic access to the line-of-credit.

In other specific embodiments of the method the terms of the emergency financial reserve agreement provide for the emergency financial reserve to be configured as a loan. In such embodiments, providing the customer with a predetermined amount further includes providing the customer with a predetermined portion of the loan for the predetermined interval. Moreover, in such embodiments, providing further includes depositing electronically the predetermined amount of funds in an account associated with the customer.

In specific embodiments of the method, verifying the validity of the emergency financial reserve further includes verifying that the fee payment is current and verifying that funds currently exist in the emergency financial reserve.

In other specific embodiments the method includes re-verifying a continual occurrence of the covered event after the predetermined interval and providing the customer with a second predetermined amount of funds from the emergency financial reserve or access to a second predetermined amount of funds from the emergency financial reserve for a second predetermined interval based on the verification of the continual occurrence of the covered event and verification that funds currently exist in the emergency financial reserve.

In still further specific embodiments of the method receiving terms of an emergency financial reserve agreement further includes receiving the terms of the emergency financial reserve agreement, wherein the terms provide for an emergency reserve protection feature that cancels any emergency reserve balance on a monthly basis during the occurrence of the covered event and provide for the emergency reserve-providing entity to receive an additional fee from the customer in exchange for emergency reserve protection.

A method for providing a line-of-credit configured emergency financial reserve, defines further embodiments of the invention, the method includes receiving, at a computing device, terms of an emergency financial reserve agreement associated with a customer. The terms provide for the customer to receive access to an emergency reserve line-of-credit based upon occurrence of one of one or more predetermined covered events and provide for an emergency reserve-providing entity to receive a fee from the customer in exchange for the emergency financial reserve. The method further includes storing, at computing device memory, the terms of the emergency financial reserve agreement. Additionally, the method includes receiving a covered event indication from the customer that indicates an occurrence of one of the one or more covered events and verifying the occurrence of the covered event and validity of the emergency financial reserve. Lastly, the method includes providing, via a computing device, the customer with access to a predetermined amount of funds from the emergency financial reserve line-of-credit for a predetermined interval based on the verification of the occurrence of the covered event and verification of the validity of the emergency financial reserve.

A method for providing a loan configured emergency financial reserve, defines other embodiments of the invention, the method includes receiving, at a computing device, terms of an emergency financial reserve agreement associated with a customer. The terms provide for the customer to receive emergency reserve funds based upon occurrence of one of one or more predetermined covered events and provide for an emergency reserve-providing entity to receive a fee from the customer in exchange for the emergency financial reserve. The method also includes storing, at computing device memory, the terms of the emergency financial reserve agreement. Additionally the method includes receiving a covered event indication from the customer that indicates an occurrence of one of the one or more covered events and verifying the occurrence of the covered event and validity of the emergency financial reserve. Lastly, the method includes providing, via a computing device, the customer with a predetermined amount of funds from the emergency financial reserve loan for a predetermined interval based on the verification of the occurrence of the covered event and verification of the validity of the emergency financial reserve.

An apparatus for providing an emergency financial reserve provides for additional embodiments of the invention. The apparatus includes a computing device includes a memory device and a processing device operatively connected to the memory device. The processor device is configured to receive terms of an emergency financial reserve agreement associated with a customer. The terms provide for the customer to receive emergency reserve funds or receive access to the emergency reserve funds based upon occurrence of one of one or more predetermined covered events and provide for an emergency reserve-providing entity to receive a fee from the customer in exchange for the emergency financial reserve. The one or more predetermined covered events include one or more of involuntary unemployment, disability, hospitalization, lifecycle events, moving, childbirth, retirement or the like. The processor device is further configured to store the terms of the emergency financial reserve agreement in the memory device. Additionally, the processor device is configured to provide the customer with a predetermined amount of funds from the emergency financial reserve or access to a predetermined amount of funds from the emergency financial reserve for a predetermined interval based on verification of occurrence of a covered event and verification of the validity of the emergency financial reserve.

In specific embodiments of the apparatus, the processing device is further configured to receiving the terms of the emergency financial reserve agreement. The terms provide for the emergency financial reserve to be configured as a line-of credit. In such embodiments, the processing device is further configured to provide the customer with access to a predetermined portion of the line-of-credit for the predetermined interval.

In other specific embodiments of the apparatus, the processing device is further configured to receiving the terms of the emergency financial reserve agreement, wherein the terms provide for the emergency financial reserve to be configured as a loan. In such embodiments, the processing device is further configured to provide the customer with a predetermined portion of the loan for the predetermined interval.

Ion further related embodiments of the apparatus the processing device is configured to provide the customer with a predetermined amount of funds from the emergency financial reserve or access to a predetermined amount of funds from the emergency financial reserve for a predetermined interval based on verifying that the fee payment is current and verifying that funds currently exist in the emergency financial reserve.

In other alternate embodiments of the apparatus the processing device is configured to provide the customer with a second predetermined amount of funds from the emergency financial reserve or access to a second predetermined amount of funds from the emergency financial reserve for a second predetermined interval based on re-verification of continual occurrence of the covered event after the predetermined interval and verification that funds currently exist in the emergency financial reserve.

In additional alternate embodiments of the apparatus, the processing device is configured to receive the terms of the emergency financial reserve agreement. The terms provide for an emergency reserve protection feature that cancels any emergency reserve balance on a monthly basis during the occurrence of the covered event and provide for the emergency reserve-providing entity to receive an additional fee from the customer in exchange for emergency reserve protection.

An apparatus for providing a line-of-credit configured emergency financial reserve defines additional embodiments of the invention. The apparatus includes a computing device including a memory device and a processing device operatively connected to the memory device. The processing device is configured to receive terms of an emergency financial reserve agreement associated with a customer. The terms provide for the customer to receive access to the emergency reserve line-of-credit based upon occurrence of one of one or more predetermined covered events and provide for an emergency reserve-providing entity to receive a fee from the customer in exchange for the emergency financial reserve. The processing device is additionally configured to store the terms of the emergency financial reserve agreement in the memory device. Additionally, the processing device is configured to provide the customer with access to a predetermined amount of funds from the emergency financial reserve line-of-credit for a predetermined interval based on verification of occurrence of a covered event and verification of the validity of the emergency financial reserve.

Another apparatus for providing a loan configured emergency financial reserve defines additional embodiments of the invention. The apparatus includes a computing device including a memory device and a processing device operatively connected to the memory device. The processing device is configured to receive terms of an emergency financial reserve agreement associated with a customer. The terms provide for the customer to receive emergency financial reserve loan funds based upon occurrence of one of one or more predetermined covered events and provide for an emergency reserve-providing entity to receive a fee from the customer in exchange for the emergency financial reserve. The processing device is additionally configured to store the terms of the emergency financial reserve agreement in the memory device. Additionally, the processing device is configured to provide the customer with a predetermined amount of funds from the emergency financial reserve loan for a predetermined interval based on verification of occurrence of a covered event and verification of the validity of the emergency financial reserve.

A computer program product defines other embodiments of the invention. The computer program product includes a computer-readable medium. The medium includes a first set of codes for causing a computer to receive terms of an emergency financial reserve agreement associated with a customer. The terms provide for the customer to receive emergency reserve funds or receive access to the emergency reserve funds based upon occurrence of one of one or more predetermined covered events and provide for an emergency reserve-providing entity to receive a fee from the customer in exchange for the emergency financial reserve. The medium additionally includes a second set of codes for causing the computer to store the terms of the emergency financial reserve agreement in the memory device. Further, the medium includes a third set of codes for causing a computer to provide the customer with a predetermined amount of funds from the emergency financial reserve or access to a predetermined amount of funds from the emergency financial reserve for a predetermined interval based on verification of occurrence of a covered event and verification of the validity of the emergency financial reserve.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
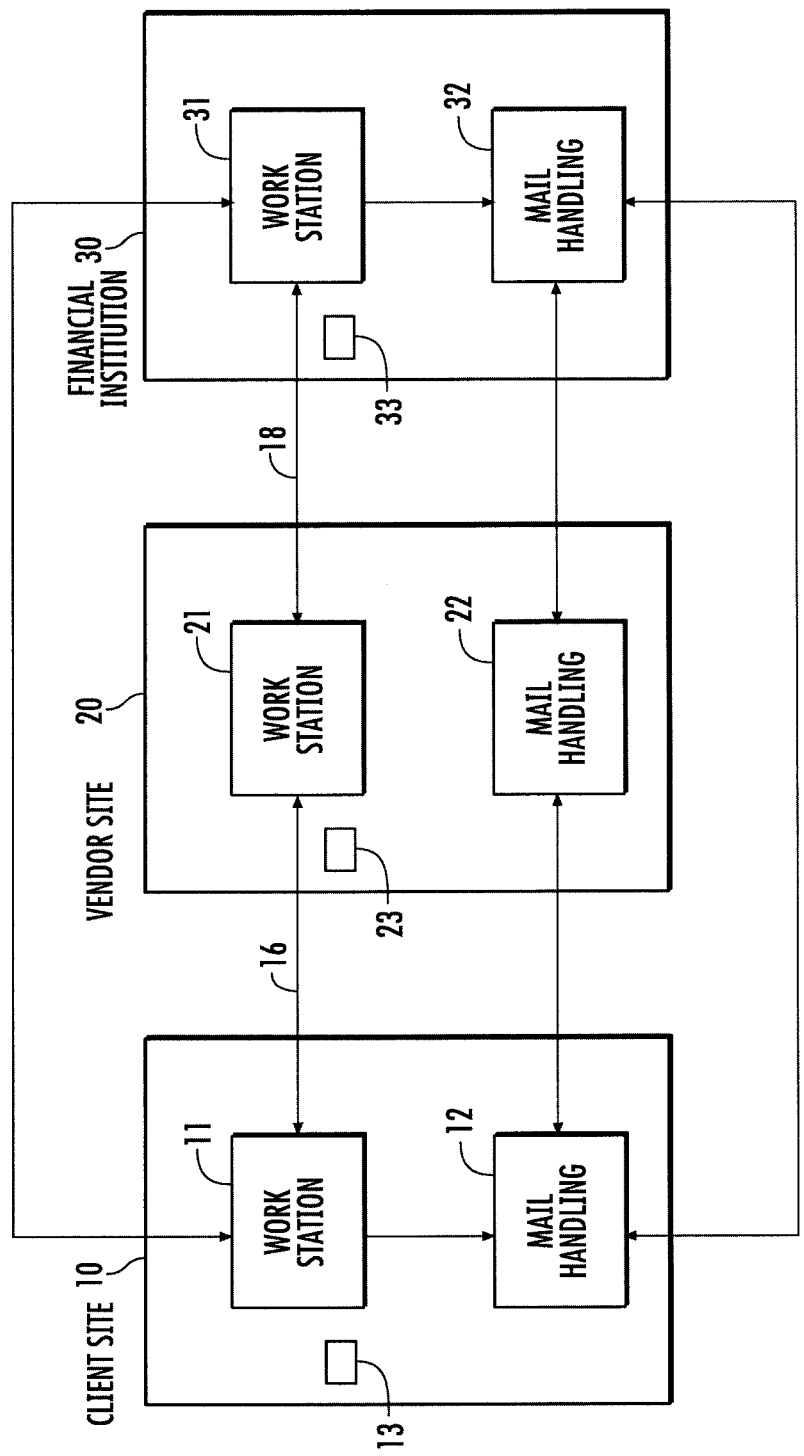
FIG. 1 is a system for providing emergency conditional credit according to an example embodiment of the present invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments according to the present invention relate to an Emergency Reserve (ER) that is a conditional credit that can be accessed only during a covered event. The covered events may be determined by a particular financial institution. For illustrative purposes, embodiments of the present invention will be described where the covered events are involuntary unemployment, disability, and hospitalization, however, embodiments of the present invention are not limited by these example covered events and includes all types of events that may be determined by a financial institution or entity providing the ER.

In certain embodiments of the invention the conditional credit takes the form of a line-of-credit, while in other embodiments of the invention the conditional credit takes the form of a loan.

The line-of-credit ER embodiments differs from the loan ER embodiments in that the line-of-credit ER can be replenished based on the customer re-paying amounts of the line-of-credit which they previously accessed. In theory, the fact the line-of-credit ERs can be replenished means that they may exist perpetually, however, in practice, line-of-credit ER's are configured with a finite duration, such as up to ten years or the like. Conversely, once the loan ER has been exhausted by the customer, the ability to be provided additional funds ceases to exist, i.e., replenishment is not possible even after repayment of the entire loan amount—the only option for the customer is to re-apply for a new ER.

In addition because the means by which the Annual Percentage Rate (APR) is calculated for a line-of-credit versus a loan and to ensure that the APR is not excessive for a loan-like ER, the period of time for which the line of credit is configured to be available is typically longer than the period of time (i.e., the coverage period) for which the loan is available. In certain embodiments of the invention, the line-of-credit ER may be available for approximately three times longer than the loan ER, for example, a line-of-credit ER may be configured to be available to the customer for upwards of ten years, while a loan ER may be configured to available for three years. After the expiration of the loan ER or the line-of-credit ER the customer is required to re-apply for a new ER product. It should be noted that in specific embodiments the APR is used to determine the fee charged for the loan ER or the line-of-credit ER, as in both instances the loan or the line-of-credit is repaid at a zero interest rate According to embodiments of the present invention in which the conditional credit takes the form of a line-of-credit, a predetermined line-of credit may be provided to a customer based on occurrence and continuation of a predetermined conditional event. In certain embodiments, a specific set amount, as opposed to the total line-of-credit, is available to the customer on a predetermined interval, such as monthly, as long as the condition that precipitated the line-of-credit being accessible continues. The set line-of-credit amount and the amount available to the client during a predetermined interval are configured by the financial institution or ER-providing entity.

For example, an entity may provide an ER that provides a $6,000 line-of-credit. In practice, the customer initially notifies the ER-providing entity of the occurrence of the covered event and, upon ER-providing entity verification of the conditional event, the customer is provided access to the specific amount set for the first month, e.g. $1,000. Thus, the customer can choose to access the line-of-credit during the first month for up to $1,000. If the covered event is still occurring after the first month, the customer is provided with access to a second specific amount for the second month; e.g., $1,000, and so on. The number of predetermined intervals afforded to the customer will depend upon the condition continuing to exist, the total amount of the line-of-credit and the amount of the line-of credit currently used by the customer. For example, if the ER is configured to provide a $6,000 line-of-credit to the customer and, upon occurrence and continuation of a predetermined condition, the customer accesses $1,000 each month, i.e., the full predetermined amount available for the predetermined interval, the customer is afforded six predetermined intervals, i.e., six months. Unless, the customer is re-paying the line-of-credit during the six months, in which case the line-of-credit is replenished and the amount available to the customer after the six month period will be equivalent to the amount re-paid (if the amount repaid exceeds the specific amount that is accessible for the predetermined period, e.g., the repaid amount is greater than $1,000, the customer will have access up to the specific amount, i.e., $1,000).

In another example of a practical application of the line-of-credit ER, the customer initially notifies the ER-providing entity of the occurrence of the covered event and, upon ER-providing entity verification of the conditional event, the customer is provided access to a first specific amount for the predetermined interval; e.g., $1,000 for the first month and, if the condition persists into the second interval, the customer is provided access to a second specific amount; e.g., $1,000 for the second month. Assuming that the condition precipitating access to the line-of-credit ER is eliminated during the second interval, the customer will no longer have access to additional funds from the line-of-credit. Additionally, assuming that the customer accessed the full amount available during the periods in which the condition existed, e.g., $2,000 over the two month period, if the customer subsequently repays the $2,000 and then the same or a different condition is determined to exist, the customer will have access to the full amount of the line-of-credit, since the previously accessed $2,000 has been re-paid.

Absent an Emergency Reserve Protection (ERP) feature (discussed infra.), the customer is required to begin repaying the conditional credit line-of-credit after a predetermined period following a disbursement; for example 90 days after a disbursements. The line-of-credit ER is required to be re-paid by the customer within a predetermined period of time, for example, within five years or the like.

According to embodiments of the present invention in which the conditional credit takes the form of a loan, a predetermined loan amount may be provided to a customer over a predetermined amount of time based on occurrence and continuation of a predetermined conditional event. The set loan amount and the set amount of time are determined by the financial institution or the ER-providing entity. In other embodiments of the invention, in which the conditional credit takes the form of a loan, the ER may be configured such that certain predetermined events, e.g., marriage, retirement, moving or the like provide for a one-time only disbursement of a predetermined amount. In such instance, the one-time only disbursement may be configured to count toward the overall ER loan balance or, in other embodiments; the one-time only disbursement may be configured to a separate loan/benefit that does not count against the overall ER loan balance.

For example, an entity may provide an ER that provides loan-like benefits of $500/month for up to 6 months; $3,000 total. In practice, the customer initially notifies the ER-providing entity of the occurrence of the covered event and, upon ER-providing entity verification of the conditional event, the customer is provided the first monthly benefit; e.g., $500. If the covered event is still occurring after the first month, the customer is provided with the second monthly benefit; e.g., $500, and so on for up to 6 months.

Absent an Emergency Reserve Protection (ERP) feature (discussed infra.), the customer is required to begin repaying the conditional credit loan after a predetermined period following the last disbursement; for example 90 days after the last of the six monthly $500 disbursements or, in the event that the qualifying condition did not exist for the entire 6 month period, 90 days after the last $500 disbursement. The loan ER is required to be re-paid within a predetermined repayment period, for example, within two years or the like.

In embodiments in which the conditional credit takes the form of a loan, the conditional credit is extended for a predetermined coverage period, for example, a three year coverage period. Once the customer has exhausted the total amount of the ER or the predetermined coverage period has expired the customer is required to re-apply for the emergency reserve product. It should be noted that in those embodiments in which the conditional credit is structured as a loan, unlike those embodiments in which the conditional credit is structured as a line-of-credit, re-applying for the emergency reserve product is required even after the loan has been paid in full.

Moreover, according to embodiments of the present invention and as previously mentioned, the ER-providing entity may provide a customer an option to add an optional debt cancellation protection feature to their Emergency Reserve. For illustrative purposes, this debt cancellation option may be called an Emergency Reserve Protection (ERP). According to specific embodiments, the ERP is offered to the customers at a higher fee than an ER without the ERP feature. The ERP protection would cancel an outstanding ER balance on a monthly basis during a covered event, resulting in the customer not having to repay the balance on the loan or the line-of-credit depending on configuration of the ER. Therefore, should a covered event occur, a customer subscribing to the ER as well as the ERP would, in the case of a loan, receive the disbursement amount for the predetermined interval for as long as the condition exists or, in the case of a line-of credit, access up to the specified amount during the predetermined interval for as long as the condition exists, but would owe nothing at the conclusion of the disbursements. This is advantageous in that a customer who has suffered a loss of income, but has enrolled in these services, gets needed cash immediately without incurring any additional debt.

Both the ER product and the ERP feature would be offered by the financial institution or entity. According to specific embodiments of the invention, the ER and its ERP feature are classified as "banking" or "financial institution" product and, as such, would be subject to Office of the Comptroller of the Currency (OCC) regulation, as opposed to an "insurance" product which would be subject to State Departments of Insurance regulations. As such, the ER product and ERP feature can be offered by non-licensed individuals, as opposed to insurance products, which require sale by licensed insurance agents.

Embodiments of the present invention providing ER and an ERP features are advantageous in that an ER is "conditional credit" that is based on the ER-providing entity's knowledge of actuarial risk. ER being "conditional credit" means that the funds can only be accessed during a covered event. By having the ER-providing entity price or otherwise set the customer's fee for the conditional credit based on a financial institution's significant incidence experience, the financial institution is able to severely mitigate the credit risk. The mitigation of the credit risk allows the ER-providing entity, such as a financial institution to offer an ER product to existing customers, as well as potential new customers, which is advantageous over current lending procedures.

FIG. 1 shows a system for providing emergency conditional credit according to an example embodiment of the present invention. The system may include a financial institution site 30 that includes a workstation 31 and the capability for sending and receiving mail 32. The system may also include a client site 10 that includes a workstation 11 and the capability to send and receive mail 12. The financial institution 30 may offer the ER product and ERP feature to a client at the client site 10 via an electronic communication means 12. The electronic communication means may be a network such as the Internet or any other type of wired or wireless electronic method of communication such as text, emails, etc. The financial institution 30 may offer the products, send applications and other documents related to the products, receive information and other documents from a client, and make benefit disbursements through the electronic communication means. Further, the client site 10, vendor site 20, and financial institution 30 may each have an apparatus 13, 23, 33, respectively, comprising a storage medium that includes instructions stored therein, that when inserted and executed help perform at least some of the processing performed by the client site 10, vendor site 20, and financial institution 30.

Alternatively, the financial institution may send marketing materials, applications and other documentation related to the ER product and ERP feature via courier or mailing or any other non-electronic method. Similarly, a client at client site 10 having mail handling capability 12 may send completed applications for the ER product and ERP feature as well as other documentation (e.g., request for emergency reserve), to the financial institution via a courier, regular mail, etc.

Although not shown, if a client at a client site 10 has successfully completed an application for the ER product and has been approved, and qualifies for an emergency reserve disbursement, the financial institution 30 may deposit via electronic means a cash payment into a bank or other institution designated by the client.

Moreover, the financial institution 30 may desire that one or more third-parties or vendors 20 serve as an intermediary between a client at client site 10 and the financial institution 30 for performing various tasks related to the ER product and the ERP feature. For example, a vendor site 20 may include a work station 21 and mail handling capability 22, and may perform any of many various tasks related to the ER product and ERP feature. For example, the vendor site 20 may handle the distribution of marketing materials to potential customers, provide applications to potential customers, receive completed applications from people, process the applications, approve or disapprove customer applications, receive requests for emergency reserve payouts, process these requests, approve or disapprove these requests, or verify that customers still qualify for the ER product and/or ERP feature, etc. This may be advantageous to a financial institution 30 in that several tasks may be off-loaded onto one or more vendor sites 20 relieving the financial institution of performing the various processing, marketing, etc. activities related to managing the offering and maintaining of the ER product and the ERP feature. In this regard, the vendor site 20 may communicate with a client site 10 via an electronic method or network 16 as well as communicate with a financial institution 30 via an electronic communication method or network 18. The vendor site 20 may also provide the various services in a non-electronic way such as via courier, mail, etc.

To illustrate embodiments of the present invention, one or more vendors will be used for handling some of the ER/ERP processing between the customer site and the financial institution. Due to the vast amount of processing and other business activities that a financial institution must manage, delegating portions of the handling of the emergency reserve product and emergency reserve protection may be beneficial in off-loading work from the financial institution that can easily be performed by a vendor(s). However, embodiments of the present invention are not limited by the use of one or more vendors as an intermediary, and any embodiments where a financial institution directly handles the maintenance and processing of an ER and ERP are within the scope of the present invention.

Moreover, the use of the term vendor and vendor site in the descriptions of embodiments of the present invention may refer to one vendor or may refer to more than one vendor. Further, the term vendor may represent different types of vendors that perform different tasks or different functions, for example, list processing, forms processing, validation processing, approval/denial processing, credit processing, or any other activity or process that may be performed by some other entity outside of the financial institution and the customer site.

Figure 2:
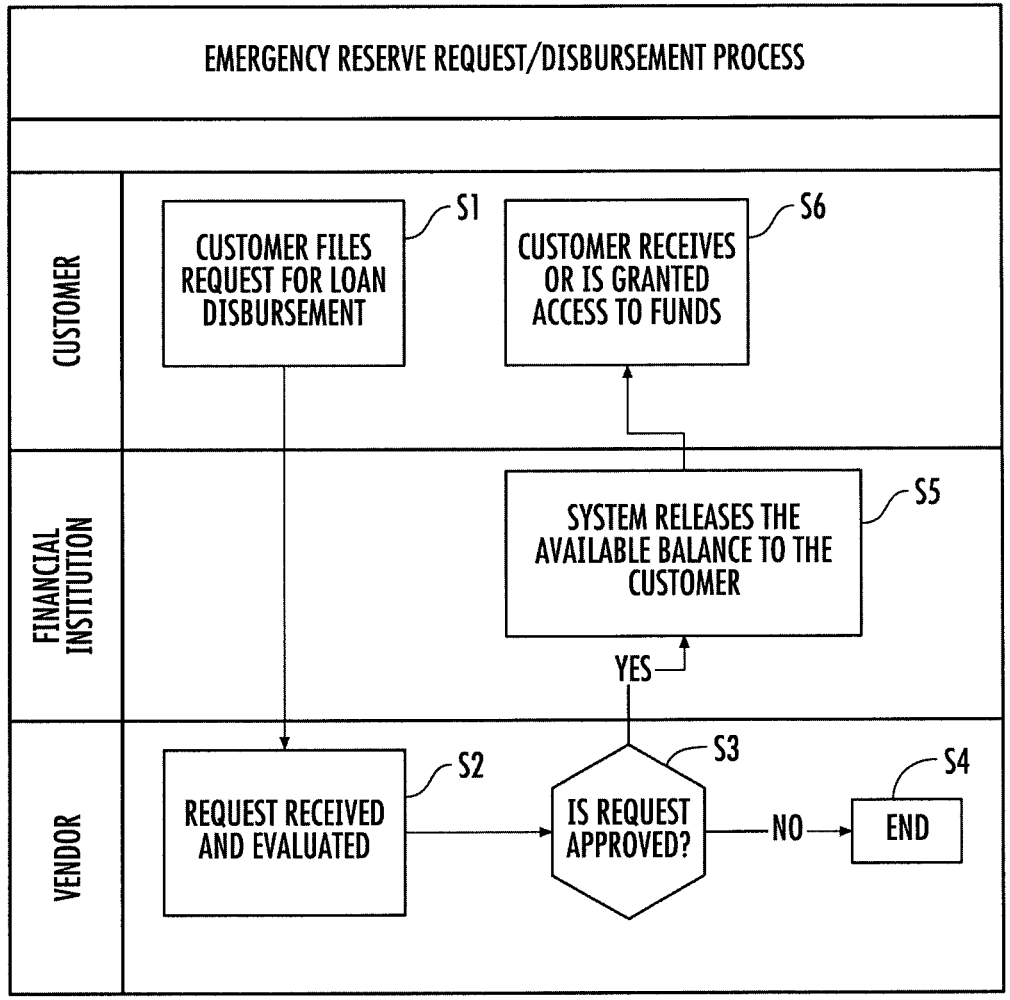
FIG. 2 is a flowchart of a process for an emergency reserve request and disbursement according to an example embodiment of the present invention.

FIG. 2 shows a flowchart of a process for an emergency reserve request and disbursement according to an example embodiment of the present invention. A customer at a customer site files a request for credit disbursement S1. A vendor company 20 receives the credit disbursement request and determines eligibility S2 (i.e., validation of the condition, payment of required fees by the customer, etc.). The vendor determines if the request is approved and, if not, the process ends S4. If the request is approved S3, approval notification is sent to the financial institution 30. The financial institution 30 then, in the loan ER scenario, releases the predetermined cash payment amount for the first interval to the customer S5. Alternatively, the financial institution 30 then, in the line-of-credit scenario, provides the customer with access to the predetermined amount for the first predetermined interval. The customer then receives or gains access to the emergency cash funds S6 and uses them appropriately.

Figure 3:
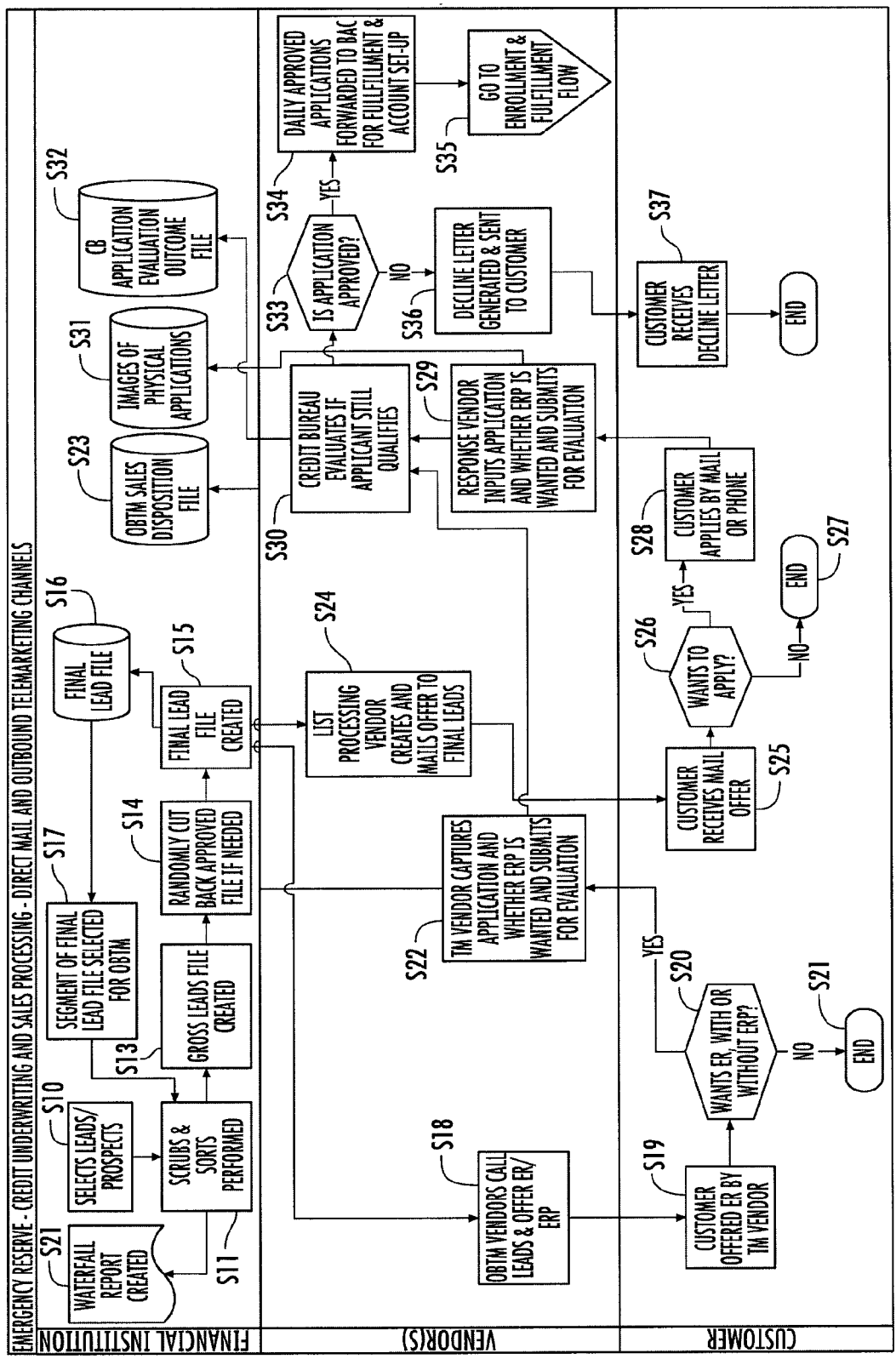
FIG. 3 is a flowchart of an emergency reserve credit underwriting and sales process according to an example embodiment of the present invention.

FIG. 3 shows a flowchart of an emergency reserve credit underwriting and sales process according to an example embodiment of the present invention. As illustrated in the figure, different functions and processes may be performed by the financial institution 30, a vendor site 20, and customer site 10. At the financial institution site 30, a marketing center may select leads/prospects for Emergency Reserve product S10. These leads and/or prospects may be scrubbed and sorted S11. A waterfall report may be created S12. The gross leads after being scrubbed and sorted may be stored in a file S13. The financial institution 30 may have set a maximum number of people to be targeted for marketing and/or offering of the ER product. If this is so, the information stored in the file may be further cut in a random or an ordered manner S14. A final lead file may then be created S15 and then stored S16. A segment of the final lead file may be selected for further processing S17. The process may repeat where the segment of the final lead file selected again undergoes scrubbing and sorting S11.

After the final lead file has been created S15, this file may be sent to a vendor. The vendor receives the final lead file and may contact the people on the list and offer them the ER product with or without the ERP feature S18. A person at a customer site may receive the ER and ERP offers, S19, and determine if the person would like to purchase these products S20. If the person does not desire these products, the process ends S21. However, if the person decides to purchase one or more of these products, the vendor is notified via receipt of an application from the person. The vendor captures the application and determines whether the ERP feature is also desired and submits the application to the financial institution for evaluation S22. The application information may be stored in a sales disposition file at the financial application S23. Further, the information may be sent to a credit bureau vendor that evaluates if the applicant (person) still qualifies for the ER product S30. A result of this application evaluation may be sent to the financial institution and stored S32.

A list processing vendor may also receive the final lead file from the financial institution and create and mail offers to the final leads S24. A person at the customer site may receive the mail offer S25 and determine if they want to apply S26 and if not the process ends S27. If the person decides to apply for the ER product, the person may apply by mail or phone S28. A vendor may then input the application from the person and determine whether the ERP feature is also desired and submit the application for evaluation to a credit bureau or credit verification vendor S29. The credit bureau may evaluate if the applicant still qualifies S30 and send this evaluation to the financial institution that may store the application evaluation outcome S32. The credit bureau vendor then may determine if the application is approved S33. If the application is not approved, a decline letter may be generated and sent to the person S36. The person may receive the decline letter S37 and the process ends. If the application is approved, this application and other approved applications may be forwarded to the financial institution for fulfillment and account set up S34. The response vendor, after inputting the application S29, may send the application to the financial institution for storage S31.

Figure 4:
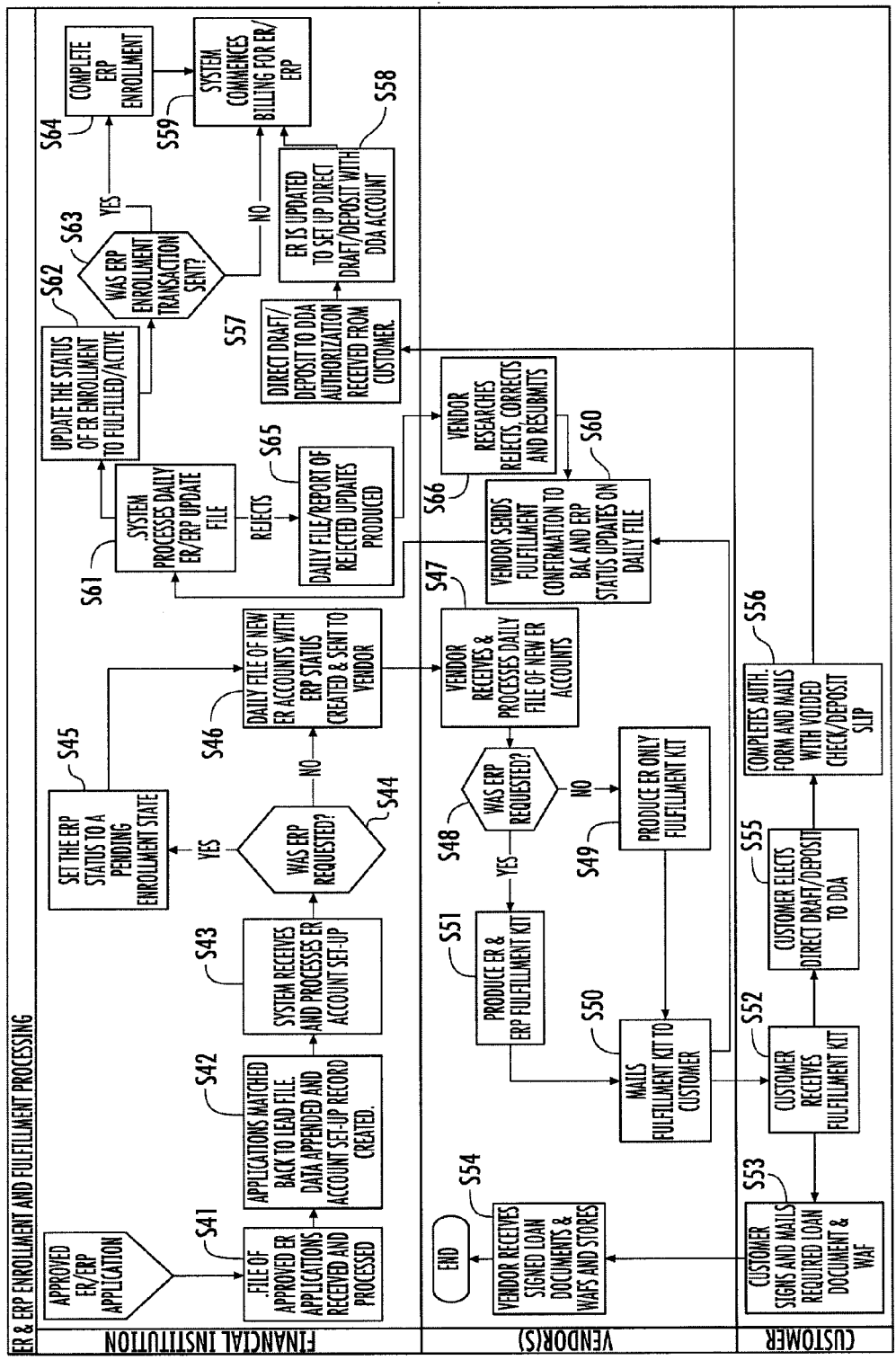
FIG. 4 is a flowchart of an ER and ERP enrollment and fulfillment process according to an example embodiment of the present invention.

FIG. 4 shows a flowchart of an ER and ERP enrollment and fulfillment process according to an example embodiment of the present invention. The approved ER/ERP application file is received and processed at the financial institution S41. The financial institution may receive several of these applications and process them simultaneously. The applications may be matched back to the lead file, data appended to the applications, and an account setup record created S42. The ER applications are processed and accounts setup S43, and it is determined whether the ERP feature was requested S44. If the ERP feature was requested, an ERP status may be set to a pending enrollment state S45. The financial institution may also create a daily file of new ER accounts with ERP status and send it to a processing vendor S46.

The processing vendor receives and processes the received daily file of new ER accounts S47, and determines whether the ERP feature was requested S48. If the ERP feature was not requested, only an ER fulfillment kit is produced S49, and the kit mailed to the person S50. If the ERP feature was requested, an ER and ERP fulfillment kit may be prepared S51, and mailed to the person S50.

At the customer site, the person receives the fulfillment kit S52, signs and mails the required credit documents to the processing vendor S53. The processing vendor then receives the signed credit documents and stores this information S54. The person may also elect direct draft/deposit to his direct deposit account S55, and complete an authorization form and send this form with appropriate other documentation (e.g., voided check/deposit slip) to the financial institution S56. The financial institution receives the direct draft/deposit to direct deposit account authorization from the customer S57, and updates the ER to set up direct draft/deposit with the direct deposit account S58. Billing then commences for the ER and ERP S59.

After mailing the fulfillment kit to the person S50, the processing vendor may then send fulfillment confirmation and ERP status updates on a daily file to the financial institution S60. The financial institution may process the daily ER/ERP update file S61. The financial institution may generate a daily file/report of rejected updates S65 and forward these to the processing vendor. The processing vendor may then research the rejects make any appropriate corrections and resubmit these to the financial institution S66. After processing the daily ER/ERP update file S61, the financial institution may update the status of the ER enrollment to fulfilled/active S62. The financial institution may then determine whether an ERP enrollment transaction was sent S63 and, if so, the ERP enrollment is completed S64. ER/ERP billing may then commence S59. If the financial institution determines that the ERP enrollment transaction was not sent S63, then the billing for the ERP may commence S59.

Figure 5:
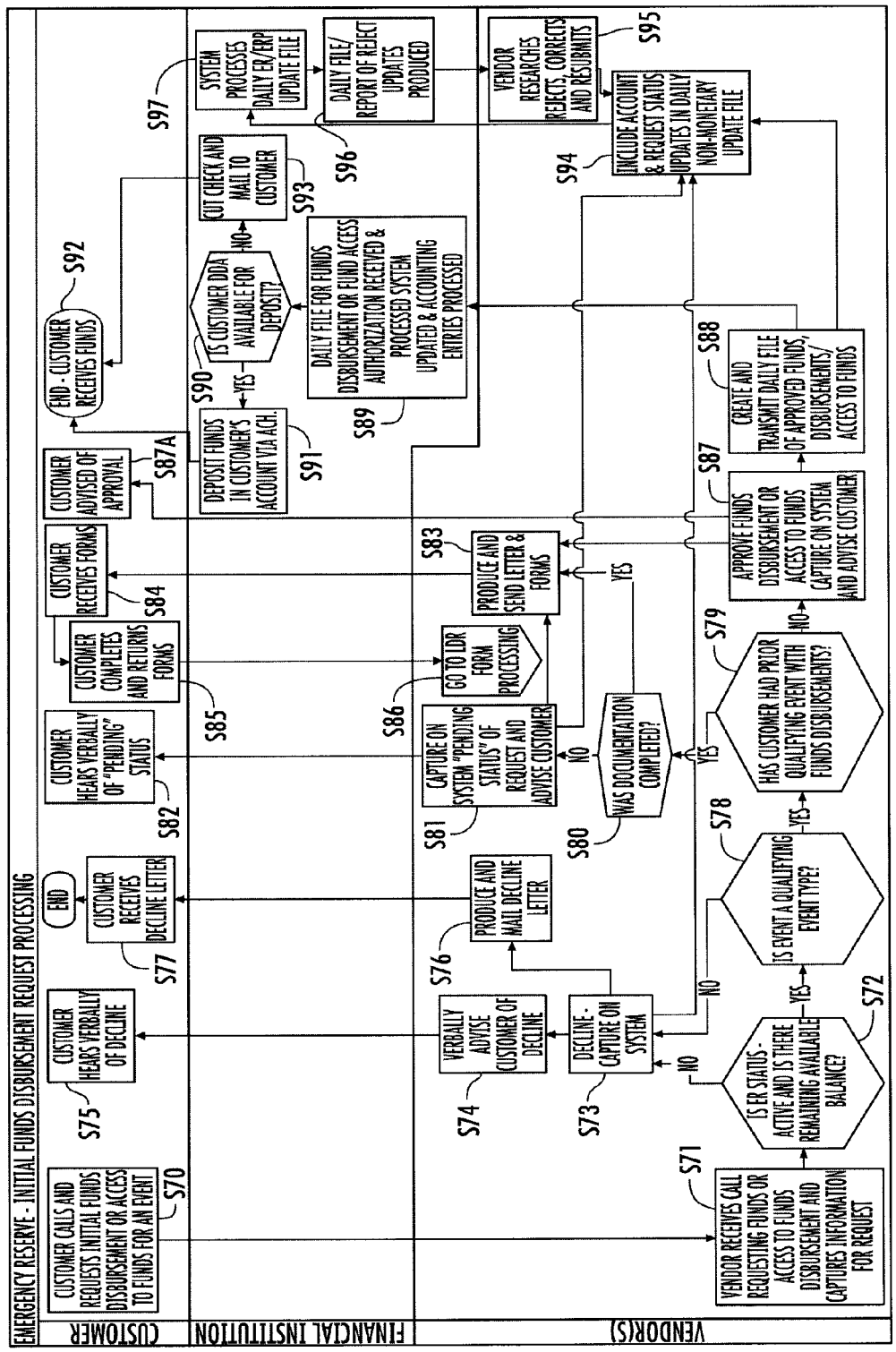
FIG. 5 is a flowchart of an emergency reserve initial credit disbursement request process according to an example embodiment of the present invention.

FIG. 5 shows a flowchart of an emergency reserve initial funds disbursement request process according to an example embodiment of the present invention. A customer may call and request an initial funds disbursement (if the ER is configured as a loan) or access to finds (if the ER is configured as a line-of-credit) based on occurrence of a covered event S70. A processing vendor may receive the call requesting the funds disbursement or access to the funds and capture required information for the request S71. The processing vendor may then determine if the ER status is active and if there is any remaining balance to draw from S72. If the ER status is not active or there is no remaining balance, the request may be declined S73 and the customer advised of the decline decision S74. The customer may hear verbally or via other methods of the decline of the request S75.

If the ER status is active and there is a remaining balance, the processing vendor may determine whether the event is a qualifying event type S78, and if not, the request is denied/declined S73 as noted previously. Alternatively the vendor may produce and mail an advisory letter to the client S76, and the customer receives the decline letter S77. If the event is a qualifying event, the processing vendor may then determine if the customer has had a prior qualifying event with fund disbursements S79. If the customer has had a prior qualifying event with funds disbursements, the processing vendor may determine whether documentation was completed S80, and if not, set a system pending status on the request and advise the customer S81. The customer may then be notified verbally of the pending status S82. Further, the processing vendor may also produce and send letters and forms related to the pending status to the customer S83. Similarly, if the documentation was completed, the processing vendor may produce and send letters and/or forms to the customer S83. The customer receives the forms S84, and completes and may return the forms to a processing center of the vendor S85 for credit disbursement form processing.

After the pending status is set for the request and the customer advised by the processing vendor S81, account and request status updates may be included in a daily non-monetary update file S94. Further, if it is determined that the customer did not have a qualifying event with funds disbursements, the funds disbursement or access to the funds may be approved S87 and the customer advised accordingly S87A. A daily file of approved funds disbursements or approved access to funds may be created and transmitted S88 by a processing vendor to the financial institution and account/request status updates included in the daily non-monetary update file S94. The financial institution may receive and process the daily file for funds disbursement or fund access authorization, and updates and processes accounting entries S89.

In the loan ER scenario, the financial institution may then determine if the customer has direct deposit account (DDA) available for deposit S90 and, if not, may cut a check and mail the check to the customer S93 where the customer then receives the funds via check S92. If a direct deposit account is available, the funds may be deposited into the customer's direct deposit account S91 where the customer then has access to the funds S92.

After the account and request status updates have been included in the daily non-monetary update file S94, a daily ER/ERP update file may be processed S97. A daily file/report of reject updates may be produced S96, and sent to the processing vendor. The processing vendor may then research the rejects, make any appropriate corrections and resubmit S95 where the account and request status updates are included again in the daily non-monetary update file S94.

Figure 6:
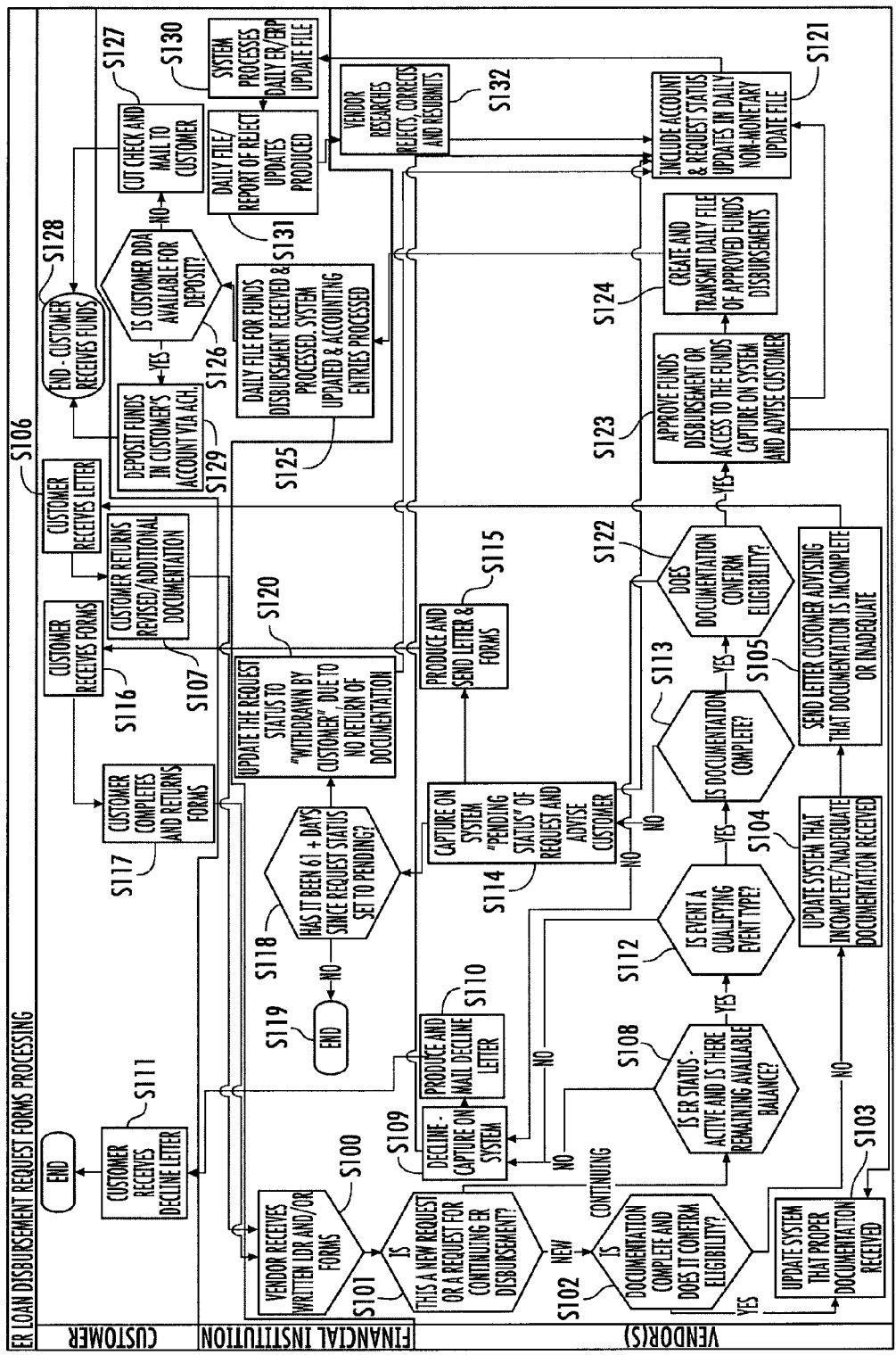
FIG. 6 is a flowchart for a continuing ER credit disbursement process according to an example embodiment of the present invention.

FIG. 6 shows a flowchart for a continuing ER credit disbursement forms evaluation process according to an example embodiment of the present invention. A processing vendor receives written (or electronic) benefit request and/or documentation forms S100. The processing vendor determines if this is a new request or a request for continuing ER benefit S101. If this is a new request, the processing vendor determines whether documentation is complete and does the documentation confirm eligibility S102. If the documentation is complete, the system is updated that proper documentation has been received S103. If the documentation is not complete, the system is updated that incomplete/inadequate documentation has been received S104, and the customer is notified and advised that the documentation is incomplete or inadequate S105. The customer receives the notification, S106, and may return the revised/additional documentation to the processing vendor S107.

If it is determined that this is a continuing ER benefit, S101, the processing vendor may determine if the ER status is active and if there is a remaining balance to draw S108. If the ER status is not active or there is no remaining balance, the request is declined S109, and a client letter saying the same may be prepared and mailed or electronically transferred to the customer S110. The customer receives the decline letter and the process ends S111.

If the ER status is active and there is a remaining balance, the processing vendor determines whether the event is a qualifying event type S112, and if not, again the request is declined S109, and a letter sent to the customer S110. However, if the event is a qualifying event, the processing vendor determines whether the documentation is complete S113. If the documentation is not complete, a pending status is captured on the system regarding the request S114, and a letter and appropriate forms produced S115, and transferred to the customer. The customer receives the forms S116, completes and returns the forms S117, and the processing vendor receives the completed documentation forms S100 and the process resumes. Further, after the pending status has been captured on the system S114, the processing vendor determines if a certain amount of days have passed since the request status has been set to "pending" S118, and if not, this part of the process ends S119. If the certain amount of time since the status has been set to "pending" has occurred, the processing vendor may update the request status to "withdrawn by customer due to no return of documentation" S120, and include account and request status updates in the daily non-monetary update file S121.

If it is determined that the documentation is complete S113, the processing vendor determines does the documentation confirm eligibility S122. If the documentation does not confirm eligibility, the request may be declined S109, and the customer notified. If the documentation does confirm eligibility, the funds disbursement or access to the funds may be approved and the approval captured on the system S123. A daily file of approved funds disbursements may be created and transmitted to the financial institution S124. This daily file is received and processed by the financial institution S125.

In the loan ER scenario, the financial institution may then determine if the customer has a direct deposit account available for deposit S126, and if not, cut a check and mail the check to the customer S127. If a direct deposit account is available, the funds are deposited into the customer's direct deposit account S129. The customer may then receive the funds either from the received check or from funds in the direct deposit account S128.

After the approval of funds S123, the processing vendor may include the account and request status updates in the daily non-monetary update file S121. The financial institution may receive and process the daily ER/ERP updates file S130, produce a daily file/report of rejected updates S131, and transmit this to the processing vendor. The processing vendor receives the daily file/report, researches, rejects, and makes any appropriate corrections, and resubmits S132. The processing vendor then includes account and request status updates in the daily non-monetary update file S121.

Figure 7:
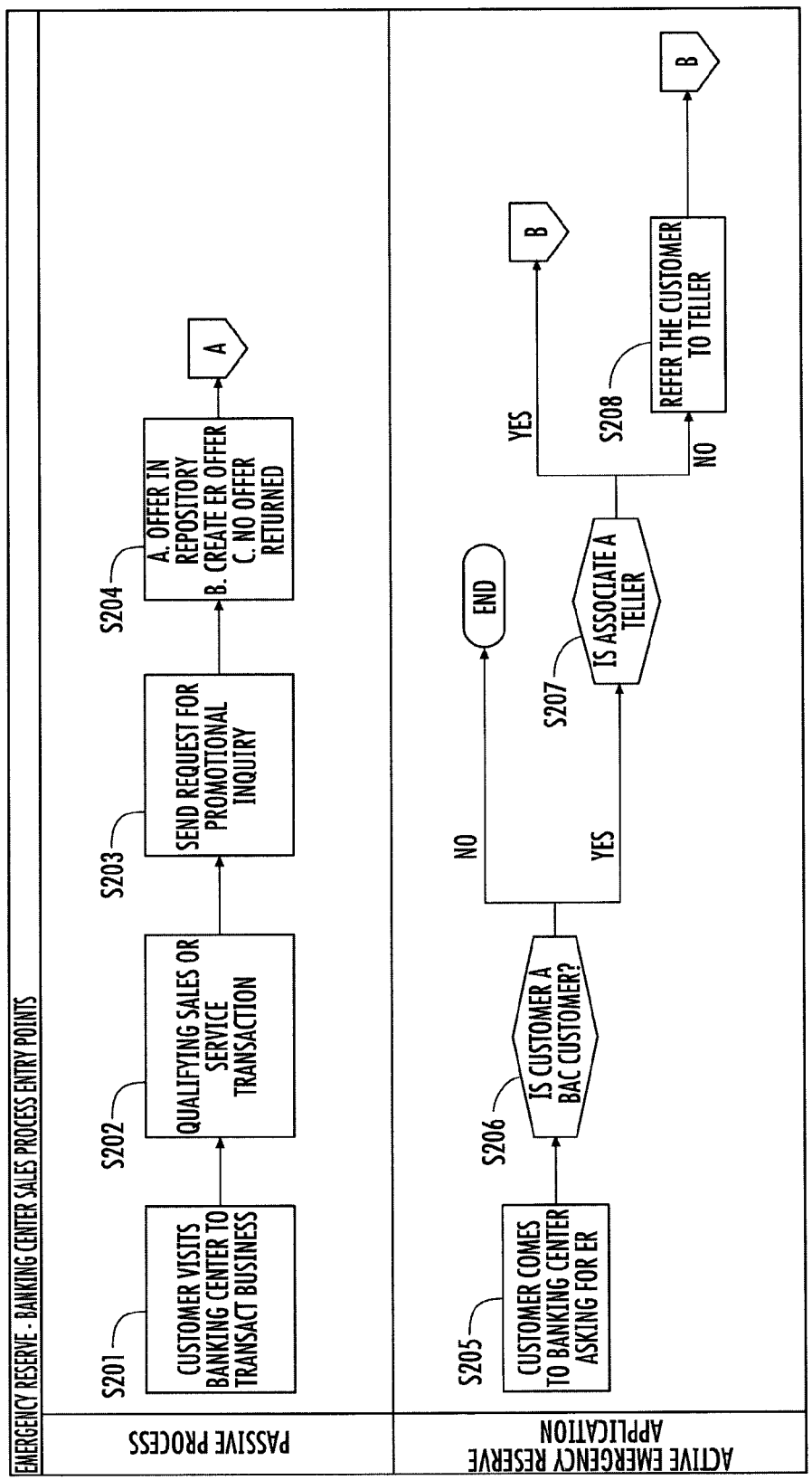
FIG. 7 is a flowchart of a process for an emergency reserve at a banking center according to an example embodiment of the present invention.

FIG. 7 shows a flowchart of a process for processing an emergency reserve at a banking center according to an example embodiment of the present invention. This process may include a passive process and an active emergency reserve activation process. In the passive process, a person visits a banking center to transact business, S201. The person performs qualifying sales or a service transaction, S202. A request may be sent for promotional inquiry, S203. Then, (a) an offer is in a repository, (b) an emergency reserve offer, that may include emergency reserve protection, is created or (c) no offer is returned, S204. This process then proceeds to block S209 in FIG. 8.

In the active emergency reserve application process, a person comes to the banking center asking for an emergency reserve, S205. It may be determined whether the person is a banking center customer, S206, and if not the process ends. If the person is a banking center customer, it may be determined if an associate helping the person is a teller, S207, and if not, the person may be referred to a teller, S208. The process then proceeds in either case to block S224 in FIG. 9.

Figure 8:
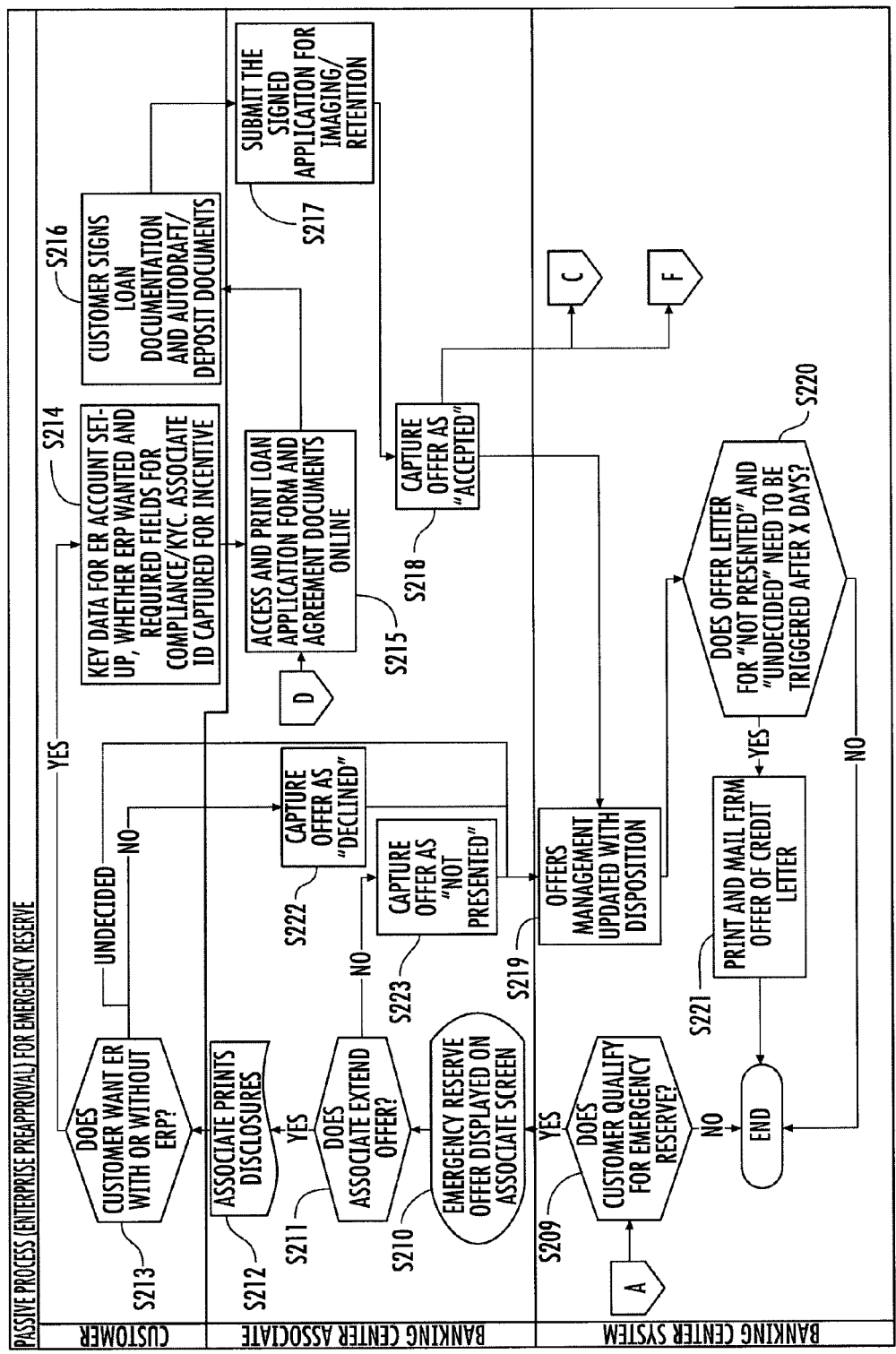
FIG. 8 is a flowchart of an enterprise pre-approval portion of the passive process of FIG. 7 according to an example embodiment of the present invention.

FIG. 8 shows a flowchart of an enterprise pre-approval portion of the passive process of FIG. 7 according to an example embodiment of the present invention. It may be determined whether the person qualifies for an emergency reserve, S209, and if not, the process ends. If the person qualifies for an emergency reserve, an emergency reserve offer may be displayed on an associates screen, S210. It may be determined if the associate has extended an offer, S211, and if not, the offer may be captured as "Not presented," S223. Offers Management may be updated with the disposition, S219. Then, it may be determined whether an offer letter for "not presented" and "undecided" needs to be triggered after a certain number of days, S220, and if not, the process ends. If it is determined that an offer letter needs to be triggered, a firm offer of credit letter may be printed and mailed, S221, and the process ends. If the associate does extend an offer, S211, the associate may print the disclosures, S212. Then, it may be determined whether the person wants the emergency reserve, S213, and if not, the offer may be captured as "declined," S222, Offers Management updated with disposition, S219, and the determination of whether an offer letter should be triggered, S220, and printed and mailed, S221, may occur as previously discussed.

If the person is undecided regarding wanting Emergency Reserve, Offers Management may be updated with the disposition S219 and the determination of whether an offer letter is triggered, S220, and printing and mailing of an offer of credit letter, S221, may occur as previously mentioned. If the person does want Emergency Reserve, with or without Emergency Reserve Protection, S213, data may be keyed for an emergency reserve account set up and required fields for compliance/KYC. The associate ID may be captured for an associate incentive, S214. The credit application form and agreement documents may be accessed on-line and printed, S215. The customer may sign the credit documentation and auto-draft/deposit documents, S216. The signed application may be submitted for imaging/retention, S217, the offer captured as "accepted," S218, and the process proceed to blocks S236 and S251 in FIG. 10.

Figure 9:
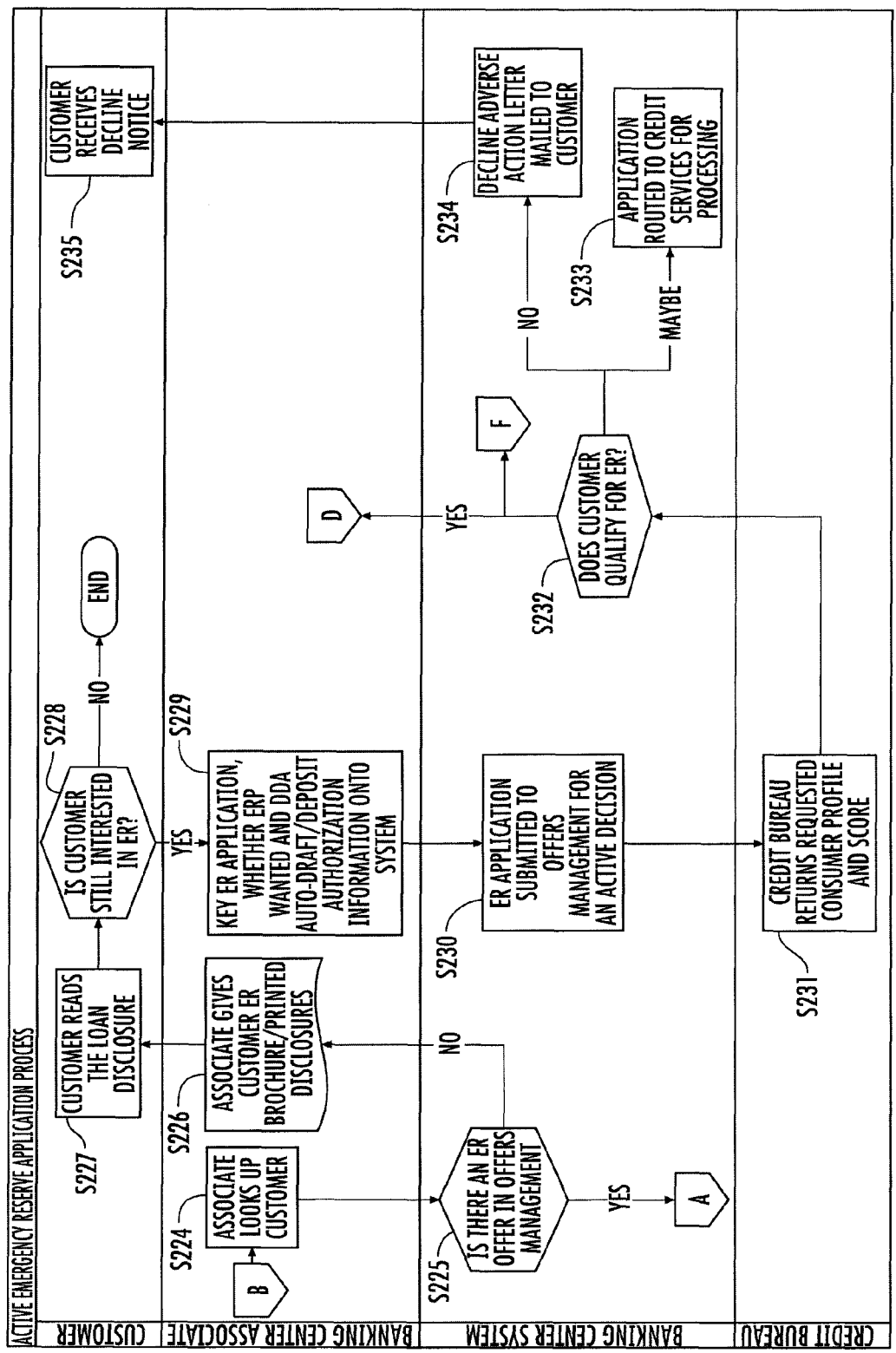
FIG. 9 is a flowchart of a further portion of the active emergency reserve application process of FIG. 7 according to an example embodiment of the present invention.

FIG. 9 shows a flowchart of a further portion of the active emergency reserve application process of FIG. 7 according to an example embodiment of the present invention. An associate may look up a person, S224. It may be determined whether there is an emergency reserve offer in Offers Management, S225, and if so, the process continues to block S209 in FIG. 8. If there is no offer in Offers Management, an associate may give the person emergency reserve brochures and other printed disclosures, S226. The person reads the credit disclosures, S227. It may be determined whether the person is still interested in Emergency Reserve, S228, and if not, the process ends. If the person is interested in Emergency Reserve, an emergency reserve application and direct deposit account (DDA) auto-draft/deposit authorization information may be keyed into the system, S229. The emergency reserve application may be submitted to Offers Management for an active decision, S230. A credit bureau may return a requested consumer profile and score, S231. It may be determined whether the person qualifies for the emergency reserve, S232, and if so, the process proceeds to block S215 in FIG. 8 and block S251 in FIG. 10. If the person might qualify for Emergency Reserve, the application may be routed to credit services for processing, S233. If the person does not qualify for emergency reserve, a decline adverse action letter may be mailed to the person, S234, and the person may receive the decline notice, S235.

Figure 10:
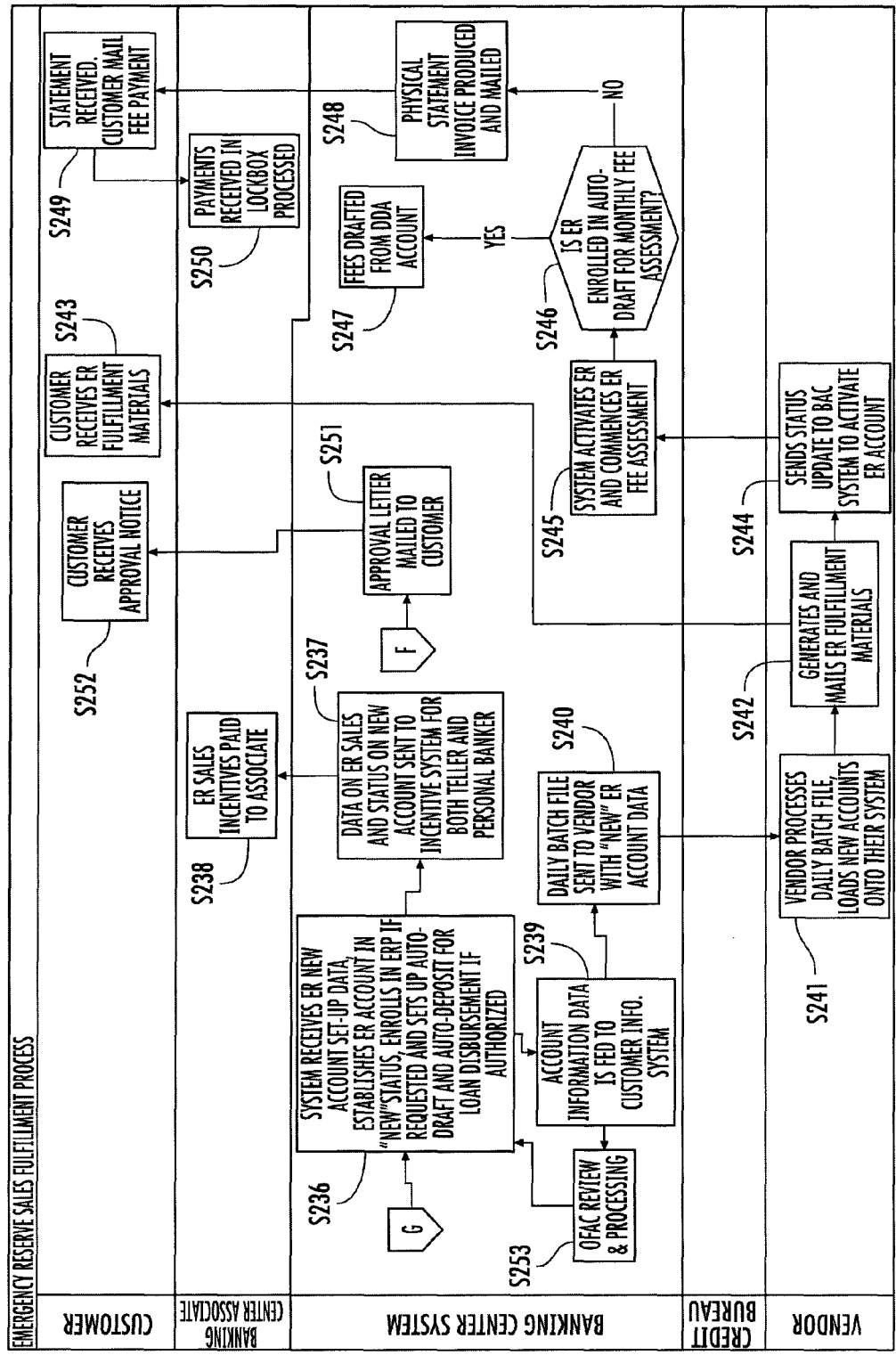
FIG. 10 is a flowchart of an emergency reserve sales fulfillment process according to an example embodiment of the present invention.

FIG. 10 shows a flowchart of an emergency reserve sales fulfillment process according to an example embodiment of the present invention. This process is a part of the passive process and active emergency reserve activation process mentioned previously. A banking center system may receive the emergency reserve new account set up data with or without emergency reserve protection, establish an emergency reserve account in "new" status and set up auto-draft and auto-deposit for credit disbursement if authorized, S236. Account information data may be fed to the customer information system, S239. Review and processing may occur, S253. After the system receives the emergency reserve new account set up data, S236, the data on emergency reserve sales and status on new account may be sent to an incentive system for both teller and personal banker, S237, and emergency reserve sales incentives paid to the associate, S238.

After the account information data is fed to the customer information system, S239, a daily batch file may be sent to a vendor with "new" emergency reserve account data, S240. The vendor may process the daily batch file, and load new accounts onto their system, S241. The vendor may generate and mail emergency reserve fulfillment materials, S242. The person receives the emergency reserve fulfillment materials, S243. An approval letter may be mailed to a person, S251, and the person receives the approval notice, S252. After the vendor generates and mails the emergency reserve fulfillment materials, S242, the vendor may send a status update to the banking system to activate the emergency reserve account, S244. The system may activate the emergency reserve and commence emergency reserve fee assessment, S245. It may be determined whether the emergency reserve is enrolled in auto-draft for periodic fee assessment, S246, and if so, fees may be drafted from a direct debit account, S247. If the emergency reserve is not enrolled in an auto-draft, a physical statement invoice may be produced and mailed, S248, the statement is received by a customer and the customer mails the fee payment, S249, and the payments are received in a lockbox by a banking center associate and processed accordingly, S250.

Figure 11:
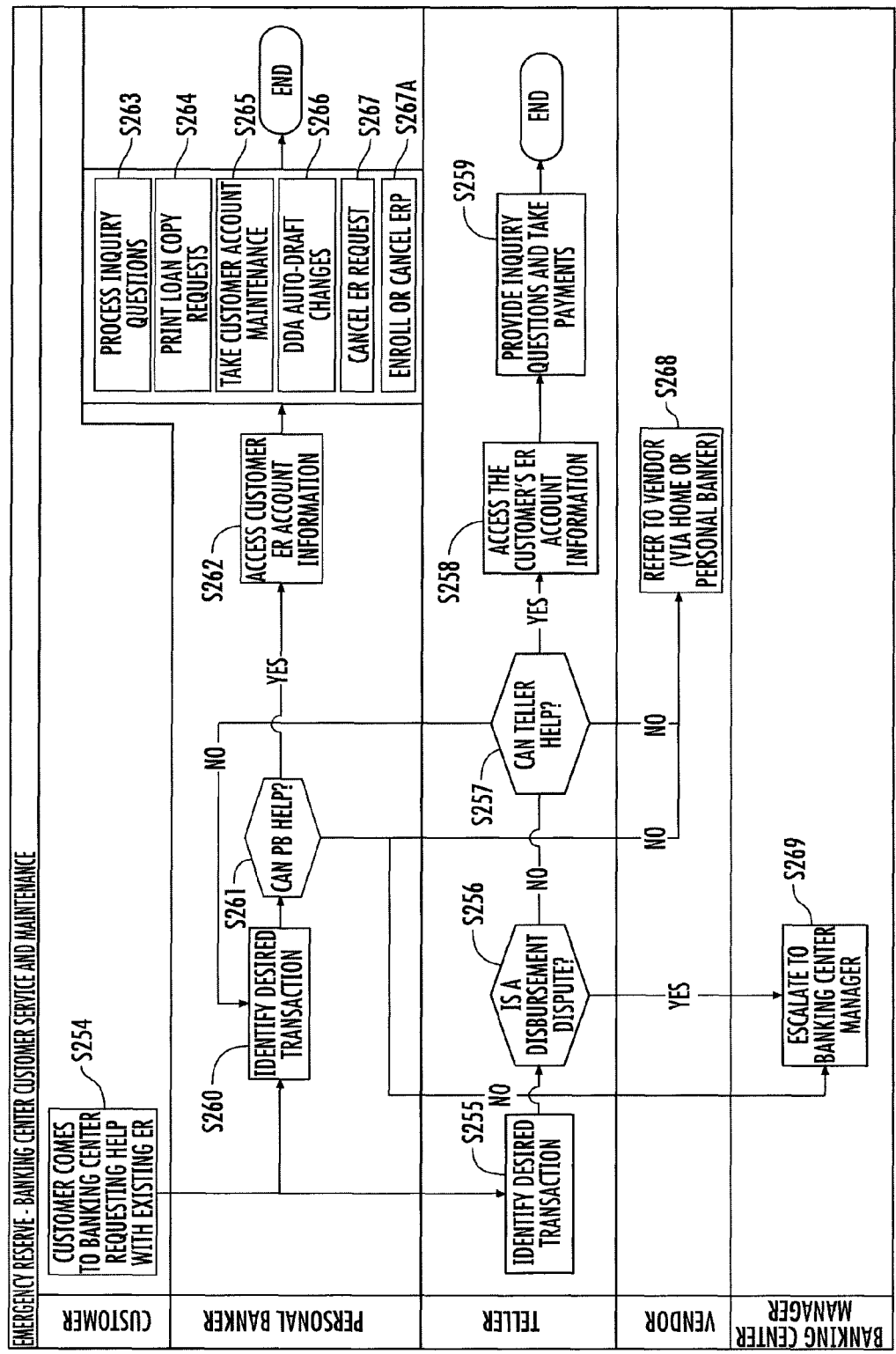
FIG. 11 is a flowchart of an emergency reserve banking center and maintenance process according to an example embodiment of the present invention.

FIG. 11 shows a flowchart of an emergency reserve banking center and maintenance process according to an example embodiment of the present invention. A customer comes to a banking center requesting help with an existing emergency reserve, S254. A personal banker may identify a desired transaction, S260, and determine whether the personal banker can help, S261. If the personal banker cannot help, the customer may be referred to a vendor, S268, or may escalate to a banking center manager, S269. If the personal banker can help, the customer emergency reserve account information may be accessed by the personal banker, S262, the personal banker may then process inquiry questions, S263, print credit copy requests, S264, take customer account maintenance, S265, make direct deposit account auto-draft changes, S266, cancel a request, S267 or enroll or cancel emergency reserve protection S267A, and then the process ends.

Moreover, after the customer comes to the banking center requesting help, S254, a teller may identify the desired transaction, S255, and determine whether it is a disbursement dispute, S256. If it is a disbursement dispute, the matter may escalate to a banking center manager, S269. If it is not a disbursement dispute, it may be determined whether the teller can help, S257, and if not, the customer may be referred to a vendor, S268, or a personal banker. If it is determined that the teller can help, the teller may access the customer's emergency reserve account information, S258, provide inquiry questions and take payments, S259, and the process ends.

System and method embodiments according to the present invention are advantageous for several reasons. For example, people having lesser credit worthiness are able to obtain credit when these people may not typically qualify for credit. Further, the use of actuary information provides a lower risk to financial institutions in offering these conditional credit products. Further, since the ER product and ERP feature are bank products, they may be sold by bank personnel as contrasted to insurance products that can only be sold by licensed personnel. Moreover, by offering these type products to current financial institution customers, the attrition of existing customers is minimized since without these products these customers may need to close their accounts to survive. Further, the ER product and ERP feature are versatile in that the initial cash amount or the initial amount accessible may be varied as well as the maximum payout amount. In this regard, the cost on a periodic fee basis to a customer may vary accordingly depending on these amounts.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for providing an emergency financial reserve, the method comprising:

receiving, by a computing device, terms of an emergency financial reserve agreement associated with a customer, wherein the terms provide for (1) an emergency financial reserve to be configured as a line-of-credit that is replenished by the customer repaying previously accessed amounts of the line-of-credit, (2) the customer to receive access to the emergency reserve line-of-credit based upon occurrence of one of one or more predetermined covered events and (3) provide for an emergency reserve-providing entity to receive a fee from the customer in exchange for the emergency financial reserve;

storing, in computing device memory, the terms of the emergency financial reserve agreement;

receiving a covered event first indication from the customer that indicates an occurrence of one of the one or more covered events;

verifying an initial occurrence of the covered event;
verifying, by the computing device, an initial validity of the emergency financial reserve; and automatically providing, by the computing device, the customer with access to a first predetermined portion of the emergency reserve line-of-credit for a predetermined first period of time in response to the verification of the initial occurrence of the covered event and verification of the initial validity of the emergency financial reserve, wherein the first predetermined amount is less than a total amount of the emergency financial reserve line-of-credit and is accessible for the predetermined first period of time;

receiving, from the customer proximate in time to expiration of the predetermined first period of time, a covered event second indication that indicates that one or more of the covered events continue to occur;

verifying a continual occurrence of the one or more covered events;

verifying, by the computing device, a continual validity of the emergency financial reserve;

automatically providing, by the computing device, the customer with access to a second predetermined portion of the emergency reserve line-of-credit for a predetermined second period of time in response to the verification of the continual occurrence of the covered event and verification of the continual validity of the emergency financial reserve;

determining that the customer has accrued an owed emergency reserve balance as a result of accessing the first and second portions of the emergency line-of-credit; and canceling, by the computing device, the owed emergency reserve balance based upon (i) determining that the customer has accrued the owed emergency reserve balance as a result of accessing the first and second portions of the emergency reserve line of credit and (ii) the terms of the of emergency financial reserve agreement including an emergency reserve protection feature.

2. The method of claim 1, wherein providing further comprises providing, by the computing device, the customer electronic access to the line-of-credit.

3. The method of claim 1, wherein receiving terms of an emergency financial reserve agreement further comprise receiving, by the computing device, the terms of the emergency financial reserve agreement, wherein the terms provide the customer to receive access to the emergency reserve line-of-credit based upon occurrence of one of one or more predetermined covered events, wherein the one or more predetermined covered events include one or more of involuntary unemployment, disability, hospitalization, lifecycle events, moving, childbirth, or retirement.

4. The method of claim 1, wherein verifying the initial and the continual validity of the emergency financial reserve further comprises verifying, by the computing device, that the fee payment is current and verifying that funds currently exist in the emergency financial reserve.

5. The method of claim 1, wherein receiving terms of an emergency financial reserve agreement further comprise receiving, by the computing device, the terms of the emergency financial reserve agreement, wherein the terms provide for the emergency reserve protection feature that cancels any emergency reserve balance on a monthly basis during the occurrence of the covered event and provide for the emergency reserve-providing entity to receive an additional fee from the customer in exchange for emergency reserve protection.

6. An apparatus for providing an emergency financial reserve, the system comprising:

a computing device including:
a memory device; and
a processing device operatively connected to the memory device and configured to:

receive terms of an emergency financial reserve agreement associated with a customer, wherein the terms provide for (1) an emergency financial reserve to be configured as a line-of-credit that is replenished by the customer re-paying previously accessed amounts of the line-of-credit, (2) the customer to receive access to the emergency reserve line-of-credit based upon occurrence of one of one or more predetermined covered events and (3) provide for an emergency reserve-providing entity to receive a fee from the customer in exchange for the emergency financial reserve, store the terms of the emergency financial reserve agreement in the memory device, automatically provide the customer with access to a first predetermined portion of the emergency reserve line-of-credit for a predetermined time in response to verification of an initial occurrence of a covered event and an initial verification of the validity of the emergency financial reserve, wherein the first predetermined amount is less than a total amount of the emergency financial reserve, automatically provide the customer with access to a second predetermined portion of the emergency reserve line-of-credit for a predetermined second period of time in response to verification of a continual occurrence of the covered event and verification of a continual validity of the emergency financial reserve, determine that the customer has accrued an owed emergency reserve balance as a result of accessing the first and second portions of the emergency line-of-credit, and cancel the owed emergency reserve balance base upon (i) determining that the customer has accrued the owed emergency reserve balance as a result of accessing the first and second portions of the emergency reserve line-of-credit and (ii) the terms of the of emergency financial reserve agreement including an emergency reserve protection feature.

7. The apparatus of claim 6, wherein the processing device is further configured to receive the terms of the emergency financial reserve agreement, wherein the terms provide the customer to receive access to the emergency reserve line-of-credit based upon occurrence of one of one or more predetermined covered events, wherein the one or more predetermined covered events include one or more of involuntary unemployment, disability, hospitalization, lifecycle events, moving, childbirth, or retirement.

8. The apparatus of claim 6, wherein the processing device is further configured to provide the customer with access to the first or second predetermined amount of funds from the emergency financial reserve line-of-credit for a predetermined interval based on verifying that the fee payment is current and verifying that funds currently exist in the emergency financial reserve.

9. The apparatus of claim 6, wherein the processing device is further configured to receive the terms of the emergency financial reserve agreement, wherein the terms provide for the emergency reserve protection feature that cancels any emergency reserve balance on a monthly basis during the occurrence of the covered event and provide for the emergency reserve-providing entity to receive an additional fee from the customer in exchange for emergency reserve protection.

10. A computer program product comprising:
a non-transitory computer-readable medium comprising:
a first set of codes for causing a computer to receive terms of an emergency financial reserve agreement associated with a customer, wherein the terms provide for (1) an emergency financial reserve to be configured as a line-of-credit that is replenished by the customer re-paying previously accessed amounts of the line-of-credit, (2) the customer to receive access to the emergency reserve line-of-credit based upon occurrence of one of one or more predetermined covered events and (3) provide for an emergency reserve-providing entity to receive a fee from the customer in exchange for the emergency financial reserve;
a second set of codes for causing the computer to store the terms of the emergency financial reserve agreement in a memory device;
a third set of codes for causing the computer to provide the customer with access to a first predetermined portion of the emergency reserve line-of-credit for a predetermined first period of time in response to verification of an initial occurrence of a covered event and verification of an initial validity of the emergency financial reserve, wherein the first predetermined amount is less than a total amount of the emergency financial reserve line-of-credit;
a fourth set of codes for causing the computer to provide the customer with access to a second predetermined portion of the emergency reserve line-of-credit for a predetermined second period of time in response to verification of a continual occurrence of a covered event and verification of a continual validity of the emergency financial reserve;
a fifth set of codes for causing the computer to determine that the customer has accrued an owed emergency reserve balance as a result of accessing the first and second portions of the emergency line-of-credit; and
a sixth set of codes for causing the computer to cancel the owed emergency reserve balance base upon (i) determining that the customer has accrued the owed emergency reserve balance as a result of accessing the first and second portions of the emergency reserve line of credit and (ii) the terms of the of emergency financial reserve agreement including an emergency reserve protection feature.

11. The computer program product of claim 10, wherein the first set of codes is further configured to cause the computer to receive the terms of the emergency financial reserve agreement, wherein the terms provide the customer to receive access to the emergency reserve line-of-credit based upon occurrence of one of one or more predetermined covered events, wherein the one or more predetermined covered events include one or more of involuntary unemployment, disability, hospitalization, lifecycle events, moving, childbirth, or retirement.

12. The computer program product of claim 10, wherein the third set of codes is further configured to cause the computer to provide the customer with access to the first or second predetermined amount of funds from the emergency financial reserve for a predetermined interval based on verifying that the fee payment is current and verifying that funds currently exist in the emergency financial reserve.

13. The computer program product of claim 10, wherein the first set of codes is further configured to cause the computer to receive the terms of the emergency financial reserve agreement, wherein the terms provide for the emergency reserve protection feature that cancels any emergency reserve balance on a monthly basis during the occurrence of the covered event and provide for the emergency reserve-providing entity to receive an additional fee from the customer in exchange for emergency reserve protection.

\* \* \* \* \*